(12) United States Patent
Auffray et al.

(10) Patent No.: US 9,141,597 B2
(45) Date of Patent: *Sep. 22, 2015

(54) METHOD AND SYSTEM OF FULFILLING REQUESTS FOR INFORMATION FROM A NETWORK CLIENT

(75) Inventors: Vincent Auffray, Paris (FR); Arnold Lescarmontier, Noisy le Grand (FR); Arnaud Bricard, Issy les Moulineaux (FR); Fabien Lecomte, Paris (FR); Jean-Marie Vallade, Noisy le Grand (FR)

(73) Assignee: International Business Machines Corporation, Armonk, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 13/493,581

(22) Filed: Jun. 11, 2012

(65) Prior Publication Data

US 2012/0311425 A1 Dec. 6, 2012

Related U.S. Application Data

(62) Division of application No. 10/016,982, filed on Dec. 14, 2001, now Pat. No. 8,250,462.

(30) Foreign Application Priority Data

Dec. 20, 2000 (EP) .................................... 00480128

(51) Int. Cl.
*G06F 17/24* (2006.01)
(52) U.S. Cl.
CPC .............. *G06F 17/243* (2013.01); *G06F 17/24* (2013.01)

(58) Field of Classification Search
CPC ............................... G06F 17/243; G06F 17/24
See application file for complete search history.

(56) References Cited

U.S. PATENT DOCUMENTS

| 5,794,259 A | 8/1998 | Kikinis |
| 6,199,079 B1 | 3/2001 | Gupta et al. |

(Continued)

FOREIGN PATENT DOCUMENTS

| EP | 0010301 A1 | 4/1980 |
| JP | 11338666 A | 12/1999 |
| JP | 2000181720 A | 6/2000 |

(Continued)

OTHER PUBLICATIONS

U.S. Appl. No. 10/016,982, filed Dec. 14, 2001, Notice of Allowance and Fees Due dated Apr. 12, 2012.

(Continued)

*Primary Examiner* — Adam M Queler
(74) *Attorney, Agent, or Firm* — Hoffman Warnick LLC

(57) ABSTRACT

Disclosed herein are a computer program product and a system of fulfilling requests for information data from a network client in a client-server environment. The system and computer program product include receiving a hypertext document and a program component and displaying the hypertext document, the hypertext document having initially no information data filling its form fields. A user requests information from a network client which calls the program component to request information and upon determination that the requested information is not stored in a buffer memory the requested information is downloaded from the network server. The form fields in the hypertext document are filled with the information and displayed.

16 Claims, 7 Drawing Sheets

(56) References Cited

U.S. PATENT DOCUMENTS

| | | |
|---|---|---|
| 6,490,601 B1 | 12/2002 | Markus et al. |
| 2002/0154162 A1 | 10/2002 | Bhatia et al. |

FOREIGN PATENT DOCUMENTS

| | | | |
|---|---|---|---|
| JP | 2000222320 A | 8/2000 | |
| WO | 0042540 A2 | 7/2000 | |

OTHER PUBLICATIONS

U.S. Appl. No. 10/016,982, filed Dec. 14, 2001, Notice of Allowance and Fees Due date Sep. 23, 2011.
U.S. Appl. No. 10/016,982, filed Dec. 14, 2001, Office Action dated Dec. 27, 2007.
U.S. Appl. No. 10/016,982, filed Dec. 14, 2001, Office Action dated Jun. 29, 2007.
U.S. Appl. No. 10/016,982, filed Dec. 14, 2001,Office Action dated Jan. 10, 2007.
U.S. Appl. No. 10/016,982, filed Dec. 14, 2001,Office Action dated Apr. 26, 2006.
U.S. Appl. No. 10/016,982, filed Dec. 14, 2001,Office Action dated Nov. 23, 2005.
U.S. Appl. No. 10/016,982, filed Dec. 14, 2001, Office Action dated Jun. 16, 2005.
Signer, et al, "A Personal Assistant for Web Database Caching", Lecture Notes in Computer Science, vol. 1789, Proceedings of the 12th International Conference on Advanced Information Systems Engineering, 2000, pp. 64-78.
Unknown, "New Hope PA Tekkorner—How to check that particular web page is being pulled from the web server and not your browser cache", http://www.newhopepa.com/tekkorner/11-01-00.htm.
International Application No. PCT/EP/01/10301, International Search Report dated Jun. 6, 2003.
Anonymous, "CVS Log for OpenThought", Sourceforce CVS Log, Nov. 16, 2000, XP002241774, http://cvs.sourceforge.net/cgi-bin/vi.
Luo et al, "Active Query Caching for Database Web Servers", XP002241644, May 18, 2000, http://www.research.att.com/conf/webdb2000/PAPERS/2b.ps.
Andreychek, Eric, "CVS log for openthought/openthought_orig/release/OpenThought", XP002241774, http://cvs.sourceforge.net/cgi-bin/vi.
Davulcu et al, "A Layered Architecture for Querying Dynamic Web Content", Copyright ACM 1999.
Anonymous, "Internet Identity Management" Ashlin Weekly Update, Apr. 3, 1999, http://www.ashlin.ca/news/HTM/19990403.htm.
Norrie et al., "OMS Connect: supporting multidatabases and mobile working through database connectivity", Proceedings of Conference on Cooperative Information Systems, Aug. 20, 1998.

METHOD AND SYSTEM OF FULFILLING REQUESTS FOR INFORMATION FROM A NETWORK CLIENT

CROSS-REFERENCE TO RELATED APPLICATIONS

This application is a divisional of U.S. patent application Ser. No. 10/016,982, filed Dec. 14, 2001, which claims priority to European Patent Application Number 00480128.8, hereby incorporated by reference in their entireties.

TECHNICAL FIELD

The invention relates generally to exchanging information in a client-server computer network. More particularly, the invention relates to a method of fulfilling requests for information data from a network client, the information data being accessible from a network server and being displayable through a form-based format hypertext document. The invention also relates to a system for carrying out such a method.

BACKGROUND OF THE INVENTION

Client-server computer networks are well known. The most prominent example of a client-server computer network is the Internet. The Internet is a collection of networks that allows users at disparate, heterogeneous computer systems to communicate with each other across organizational and geographical boundaries. The exchange of information on the Internet follows the traditional network rule based on the client-server architecture.

The Internet uses a packet switched protocol referred to as the Transmission Control Protocol/Internet Protocol (TCP/IP). Full Internet access usually includes five key features; electronic mail (e-mail), logging on to Internet-connected computers using Telnet, transferring files from Internet-connected computers using File Transfer Protocol (FTP), getting access to discussion groups, and using various information-research tools, especially the World Wide Web (WWW or Web).

The present invention is particularly concerned with the World Wide Web. The World Wide Web is a hypertext-based information service that makes collections of information available across the Internet. It allows web browser clients to access information from any accessible web server and supports multiple media types. The World Wide Web can be used to invoke other software by means of embedded hypertext links. Hypertext Markup Language (HTML) is used to describe static text documents, and a web browser is essentially an HTML interpreter. A Uniform Resource Locator (URL) is basically a network location which tells the user not only where something is (its address), but also what it is. The basic form of a URL address is service://hostname/path which identifies what Internet service is needed to reach the resource, what computer it is located on, and enough detail to find what is being searched for. Embedded hypertext links on a given web page can be used to find information related to the given web page. By clicking on a hypertext link in one web page, the user can display another related web page or even invoke a related program.

By navigating through the Web, it is now possible to connect and communicate with platforms of different architectures, such as remote databases, accessible via web servers. Typically, data stored in a remote database are presented to a user connected to a web client (e.g., a web browser), through a form-based format HTML document, commonly referred to as HTML form. In the HTML form, data which is to be looked up i.e., the "dynamic data", populates dedicated fields of the HTML form. At the client side, the HTML document is interpreted by the client web browser and a GUI (graphical user interface) presenting the data is displayed to the user.

According to a typical process, an input HTML form is used to collect data defining a request from a user connected to a web client. The request data is then supplied to a language-independent interface program in the web server, such as a CGI program (common gateway interface) or a servlet program, which interfaces a database application program that is responsible for providing the data requested. The server interface program finally produces an output HTML form containing the requested data populating the form fields, and send it to the web client.

Thus, at the server side, the data which is looked up, i.e., the "dynamic" or "useful" data is retrieved from their storage location, and then merged with the static data i.e. the "template" or "mask" data of the HTML form-based format document, finally the whole document is sent to the web client.

However, the above process presents the shortcomings that it penalizes the response time and generates internet traffic overheads, particularly, for example, in cases when only the dynamic data varys while the static data remains unchanged from one query to another; in other words, when the way of presentation of the data remains unchanged.

Still according to that typical process, when a user, at the client side, wants to make a new information query through a GUI displayed, a new request is generated through an HTML form and the whole document is sent to the web server, even if the new data requested had already been sought and obtained by the user during the same database query session. This again penalizes the response time and generates internet traffic overheads.

Furthermore, in cases when the user wants to update certain data currently displayed through the HTML form, the user typically modifies that data by changing the value of certain fields of the HTML form displayed i.e., the web page currently displayed. To validate that modification the whole HTML form is transmitted to the web server. Now, if the web page displayed was only a portion of a data record stored in the database, then, in order to modify another portion of the same data record, the user has to make a new request for downloading that portion of the same data record. This latter operation is again not effective in terms of response time and Internet traffic overheads generated. Furthermore, it is not convenient for the user.

SUMMARY OF THE INVENTION

Accordingly, a main object of the present invention is to overcome the above-mentioned shortcomings of prior art methods of accessing information from a web client.

This and other objects are achieved by the invention, by providing, in one aspect, a method of fulfilling requests for information data from a network client, this information data being accessible from a network server and being displayable through a form-based format hypertext document whereby the information data is provided by the filling of dedicated form fields in the hypertext document. In accordance with the invention, this method comprises the following steps:

receiving at the network client, sent from the network server, a hypertext document and a program component;

displaying the hypertext document, the hypertext document having initially no information data filling its form fields;

obtaining a request for information from a user of said network client through a user interface presented to the user as a result of the displaying of the hypertext document, and calling the program component for obtaining the requested information data;

upon determination that the requested information data is already or not stored in a buffer memory allocated to the program component in the network client, obtaining the requested data by retrieving them from the buffer memory, or downloading them from the network server;

filling the appropriate form fields in the hypertext document with the obtained information data, and displaying the hypertext document with the requested information data contained therein.

The method of fulfilling client requests for information data as succinctly defined above makes it possible to save a great deal of network traffic between the client and the server. This is achieved, in the one hand, by neatly separating the management of the (HTML) form (i.e. static data or mask data) displayed to the user, from the data obtained from the database (i.e. the dynamic data); and, in the other hand, thanks to a temporary storing of the dynamic data controlled by the program component in the client machine. Furthermore, the response times in looking up data in the client machine are considerably reduced, due notably to the temporary storage of downloaded data locally in the client machine (in the buffer memory). Besides a client browser to be used to request information data to look up is completely standard, i.e. it need not be adapted or configured to implement the present invention.

According to an advantageous characteristic of the invention, the user is provided with the capability of modifying at least some of the information data which is presented to him(her), by changing the content of the corresponding form fields through the user interface. The method according to the invention, comprises the further steps of:

automatically retrieving the modified information data contained in the form fields and calling the program component in order to store the modified information data in the buffer memory;

in response to an action performed by the user through the user interface, said action being performed independently of the retrieval of modified information data, calling the program component in order to upload to the network server the modified information data.

One advantageous feature is that the user (validation) action is performed independently of the retrieval of the modified information data. That is, the user may look up other data records and decide to "commit" the modifications applied to one or more records at the end of the database lookup session.

According to a preferred implementation of the invention, the hypertext document is an HTML document in which the content of the form fields is managed by a script program referenced in the HTML document by appropriate tags. The script program is notably responsible for calling the program component for triggering a download of information data requested by the user, for automatically retrieving from the form fields modified information data and calling the program component for temporarily storing the modified information data in the buffer memory, and for calling the program component for triggering an upload of previously stored modified information data.

According to a preferred embodiment of the invention, the so-called script program is a JAVASCRIPT program and the so-called program component is a JAVA applet, that are referenced in the HTML document by appropriate tags.

Another important and advantageous feature of the invention is the "coupling" between a script program (JAVASCRIPT program in the preferred implementation) that manages the interaction between the HTML form and a user connected to a network client, and a program component (applet) that controls the interaction between the HTML form presented to the user and the distant server. In particular the (applet) program component is provided with a buffer memory allocated to it in the network client and intended notably for temporarily storing data downloaded to the client or to be uploaded to the server from the client, thus acting as a cache memory.

According to another aspect, the invention concerns a computer system comprising means adapted for carrying out a method of fulfilling requests for information as succinctly described above.

The invention also concerns a computer program comprising software code portions for performing a method as briefly defined above, when the computer program is loaded into and executed by a computer. The invention further concerns a computer program product stored on a computer readable medium. The computer program product comprises computer readable program means for causing a computer to perform a method of fulfilling requests for information as briefly defined above.

The advantages of this computer system, this computer program, this computer program product are identical to those of the method as succinctly disclosed above. Other particularities and advantages of the invention will also emerge from the following description.

BRIEF DESCRIPTION OF THE DRAWINGS

In the accompanying drawings, given by way of non-limiting examples:

FIG. 2, which includes

Like reference numerals refer to corresponding parts throughout the several views of the drawings.

DETAILED DESCRIPTION OF THE INVENTION

Figure 1:
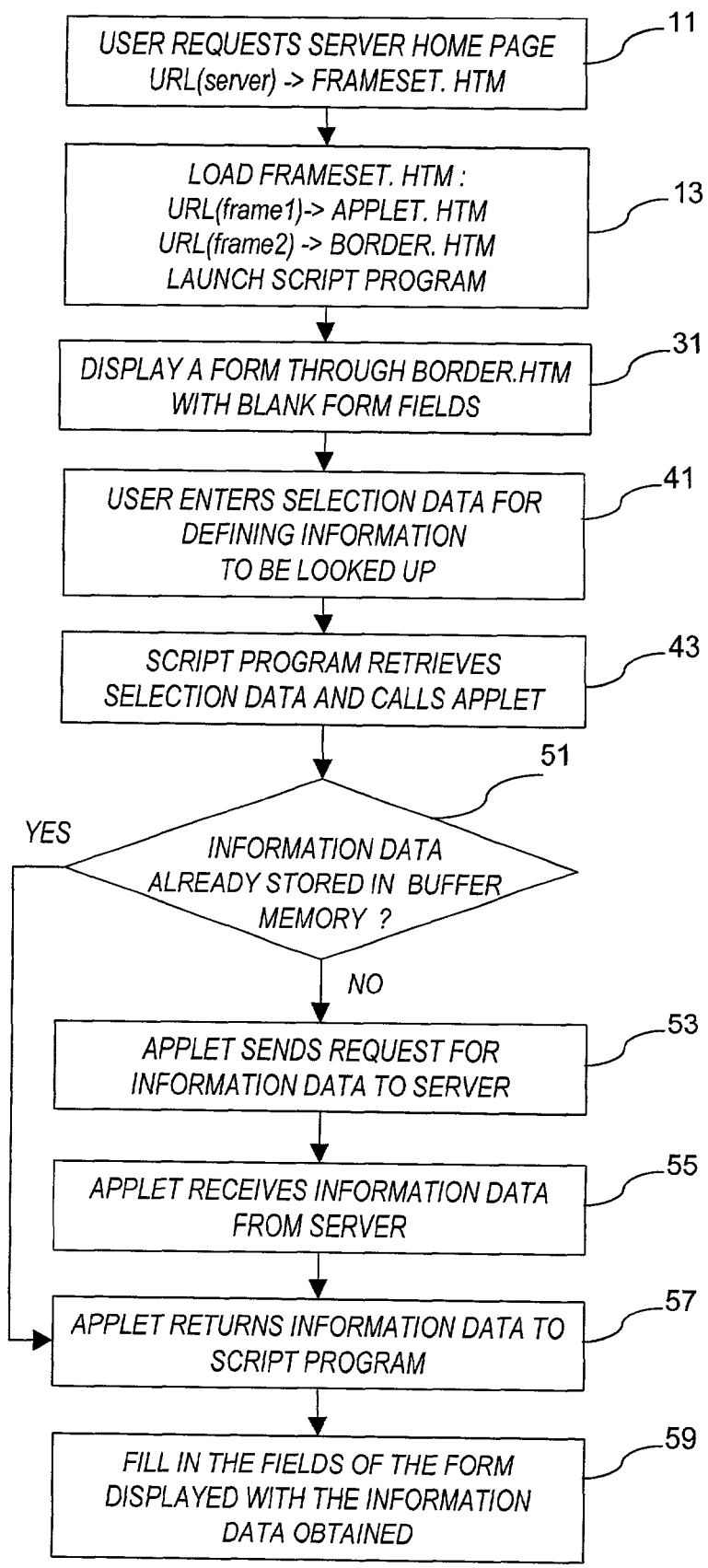
FIG. 1 is a flowchart illustrating the main steps of a method of fulfilling requests for information data from a network client, in accordance with the invention.

The following definitions may be useful in furthering the understanding of the present invention:

APPLET—a small JAVA program that can be embedded in an HTML page. Applets differ from full-fledged JAVA applications in that they are not allowed to access certain resources on the local computer, such as files and serial devices (modems, printers, etc.), and are prohibited from communicating with most other computers across a network. The current rule is that an applet can only make an Internet connection to the computer from which the applet was sent.

BROWSER—a client software program that is used to look at various kinds of Internet resources.

CLIENT—a computer or a software package that is used to contact and obtain data from a server software program or another computer, often a great distance apart. Each client program is designed to work with one or more specific kinds of server programs, and each server requires a specific kind of client. A web browser is a specific kind of client.

CGI—Common Gateway Interface provides an interface for running programs on a world Wide Web server. The most common uses are for input forms with dynamic returns forms. The CGI-BIN is often the directory where a specific CGI program is located on the server.

GUI—graphical user interface which allows interaction between a computer user and an application by graphical commands as opposed to typed commands.

HTML—hypertext mark-up language enables embedding of simple commands within standard ASCII text documents to provide an integrated visual display. HTML is used in Internet and WWW applications allowing the user to specify text size and flow, integrate audio and pictures, create links and to create interactive forms.

HTTP—hypertext transport protocol allows moving of hypertext files across the Internet. It requires an HTTP client program on the one hand, and an HTTP server program on the other hand. HTTP is the most important protocol used in the WWW.

INTRANET—A private network inside a company or organization that uses the same kinds of software that you would find on the public Internet, but that is only for internal use. As the Internet has become more popular many of the tools used on the Internet are being used in private networks, for example, many companies have web servers that are available only to employees.

JAVA—JAVA™ is a network-oriented programming language invented by Sun Microsystems that is specifically designed for writing programs that can be safely downloaded to a computer through the Internet and immediately run without fear of viruses or other harm to the computer or files. Using small JAVA programs (Applets), web pages can include functions such as animations, calculators and other fancy tricks.

JAVASCRIPT—a scripting language that allows lines of JAVA code to be inserted into HTML scripts. The Microsoft version is named Jscript™.

SERVLET—Servlets are modules of JAVA code that run in a server application (hence the name "servlets", similar to "applets" on the client side) to answer client requests. Servlets are not tied to a specific client-server protocol, but they are most commonly used with HTTP and the word "servlet" is often used in the meaning of "HTTP servlet". Since servlets are written in the highly portable JAVA language and follow a standard framework, they provide means to create sophisticated server extensions in a server and operating system independent way. Servlets are replacing progressively CGI programs.

The present invention aims to provide a method of fulfilling requests for information data from a network client in a client-server networking environment. The information data requested is accessible from a network server, e.g., a database server, and is displayed to a user in a form-based format hypertext document. That is, when the hypertext document is displayed, data is presented to the user as populating fields of a form. Such database applications whose data is typically presented to a user through displayed forms, include for example banking database applications and human resources database applications.

Referring now to the drawings, and more particularly to FIG. 1, a description will be given of the main steps of a method of fulfilling requests for information data from a network client, in accordance with the invention. The network client is typically a client machine such as a computer.

The method illustrated at FIG. 1, starts at step 11 in which a user connected to a client machine makes a request for a network server home page. The network server considered here is a database server that provides information stored in a database locally stored in the server machine or accessible via the server machine. That is, in the latter case, the database may be accessible through a private network such as a local area network (LAN) or an Intranet, to which the server machine is connected.

The user gains access to the server home page by "pointing" a web browser running on the client machine to the corresponding URL, denoted here "URL(server)". As shown in box 11, "URL(server)" points to a hypertext document referred to here as "FRAMESET.HTM". In practice this hypertext document is a HTML document.

At step 13 the client receives the HTML document sent from the server. The HTML document is then loaded by the client web browser. As previously mentioned, the HTML document loaded is a form-based hypertext document whereby the information data displayed through it is provided by the filling of dedicated HTML form fields in the document.

According to the invention, the content of the HTML form fields is managed by a script program, i.e., a scripting language program, referenced in the HTML document "FRAMESET.HTM" by appropriate tags. In the preferred implementation of the invention, that script program is a JAVASCRIPT program.

As will be further detailed, the script program is notably responsible for calling the program component for triggering a download of information data requested by a user, for automatically retrieving from the form fields modified information data and calling a program component for temporarily storing the modified information data in a buffer memory associated to the program component, and for calling the program component for triggering an upload of previously stored modified information data.

According to a preferred embodiment of the invention, the HTML document "FRAMESET.HTM" includes at least two frames. To this end, the document "FRAMESET.HTM" commonly includes the appropriate following HTML tags:

<FRAMESET . . . > and </FRAMESET>.

The content of one of the frames is associated with a URL referred to as "URL(frame1)" and points to an HTML document herein designated by "APPLET.HTM". Another one is associated with a URL referred to as "URL(frame2)" which points to an HTML document denoted "BORDER.HTM". The following HTML tags contained in HTML document "FRAMESET.HTM" show the principle of the definition of frames in an HTML document.

```
<FRAMESET>
<FRAME SRC=".../APPLET.HTM" height=0>
<FRAME SRC=".../BORDER.HTM">
</FRAMESET>
```

HTML document "APPLET.HTM" contains a reference, effected by appropriate HTML tags, of a program component which is a JAVA small program called "Applet" in the preferred implementation of the invention. JAVA applets are inserted into a HTML document by means of the <APPLET> tag.

In the other hand, HTML document "BORDER.HTM" contains, referenced by appropriate tags, the JAVASCRIPT program previously mentioned. JavaScript code is inserted with the help of the following tag: <SCRIPT LANGUAGE="JAVASCRIPT">.

Returning to FIG. 1, at step 13 when the HTML document "FRAMESET.HTM" is loaded, the JAVASCRIPT script program is launched, and at following step 31, the HTML document is displayed to the user on a display screen, that is, a HTML form is shown. That form is shown through the frame corresponding to HTML document "BORDER.HTM" and is managed by the script program contained therein. In the other hand, the frame corresponding to HTML document "APPLET.HTM" is hidden by setting the attribute "height" to 0 as shown above.

In accordance with the invention, the form displayed to the user in initially displayed with its fields being blank, that is, there is no information data filling the fields.

Figure 3:
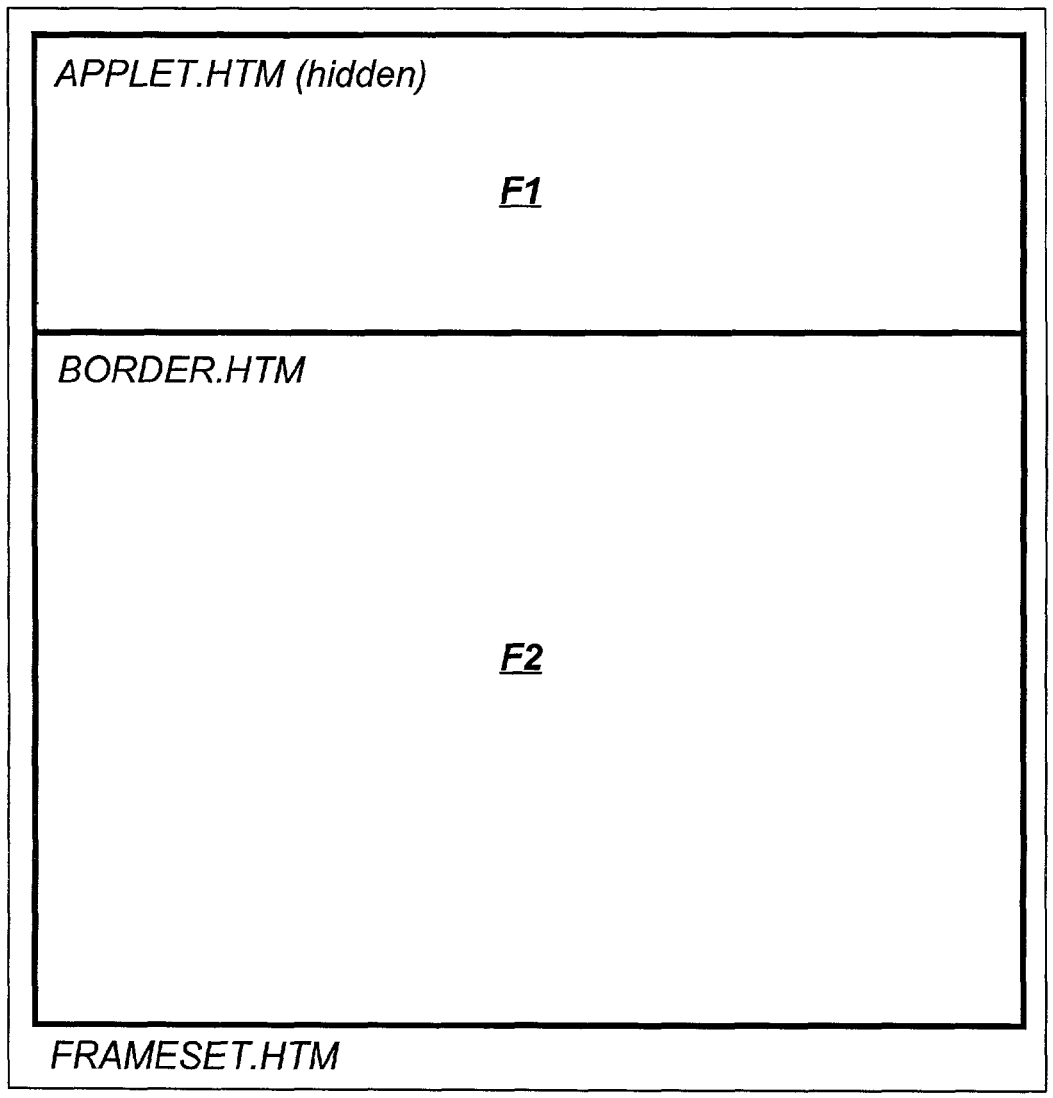
FIG. 3 is a diagram showing the layout of a screen into two frames in accordance with a preferred embodiment of the invention.

A layout of a screen into two frames in accordance with a preferred embodiment of the invention is shown in FIG. 3. In FIG. 3, there is shown a diagram of a computer screen on a client's computer, referred to herein as the browser's screen. The browser's screen is divided into two frames by the parent, initial frame, i.e., HTML document "FRAMESET.HTM". The larger frame F2, referred to as "BORDER.HTM" frame, contains the HTML form wherein fields are used to display information data requested by the user. Above frame F2 is another frame, frame F1, referred to as "APPLET.HTM" frame. Frame F1 is hidden, i.e. not visible by the user. However, for the purpose of debugging the applet program component, this frame can be rendered visible by setting appropriately some HTML tags (e.g., "height" different from 0). As previously mentioned, the fields content of the displayed HTML form is controlled by the JAVASCRIPT program contained in document "BORDER.HTM".

Now, returning to FIG. 1, at step 41, a request for information is obtained from the user of the client computer. That information request is defined by the user through a GUI (graphical user interface) presented to the user as a result of the displaying of the HTML document "BORDER.HTM". Typically, the user enters a selection data defining the information that he wants to look up by clicking with a mouse on graphical items displayed on the screen. As soon as the selection data is entered by the user, at step 43, they are retrieved by running specific code of the JAVASCRIPT program and the applet program component is called. More specifically, a predefined method (as meant in object-oriented programming) of the applet component is called, with the aim of obtaining the requested information data.

According to the invention, a buffer memory is allocated to the applet program component when it is running on the client computer. This buffer memory acts as a cache memory for temporarily storing data downloaded from the remote database or updated data to be uploaded to the database.

Following step 51 is a determination step, in which it is determined whether or not the information data requested by the user is already stored in the buffer memory associated to the applet component. The information requested would already be stored in the buffer memory, for example if it a case when these data have been previously looked up by the user during the same server connection session.

If the information requested is already stored in the buffer memory, as shown at step 57, then the requested information is retrieved from the buffer memory by the applet component and is returned to the JAVASCRIPT program.

Conversely, if the information data is not found in the memory buffer then the information requested is to be downloaded from the server. To this end, at step 53, the applet component triggers the sending of a request for information data to the server. The information request is received and processed by the server, which in turn sends the information data requested, via the network, to the client browser.

As shown at step 55, the information data sent by the server is received by the applet component in the client browser. Then, at step 57, the applet component returns the information data obtained to the JAVASCRIPT program.

Lastly, at step 59, under control of the JAVASCRIPT program, appropriate fields of the displayed HTML form are filled with the obtained information data, so that the user can see the information he has requested.

According to the preferred embodiment of the invention, transmission (download or upload) of data—i.e., hypertext documents and information data requested or updated by the user—between the client machine and the server machine is effected using the HTTP protocol.

Now with reference to FIG. 2 including FIGS. 2a-2d, there will be described in more detail a method of fulfilling requests for information data from a network client, according to a preferred implementation of the invention. In these figures, which are flow charts, some of the method steps depicted, are identical to steps already described in connection with FIG. 1, and as such will not be further described.

Figure 2A:
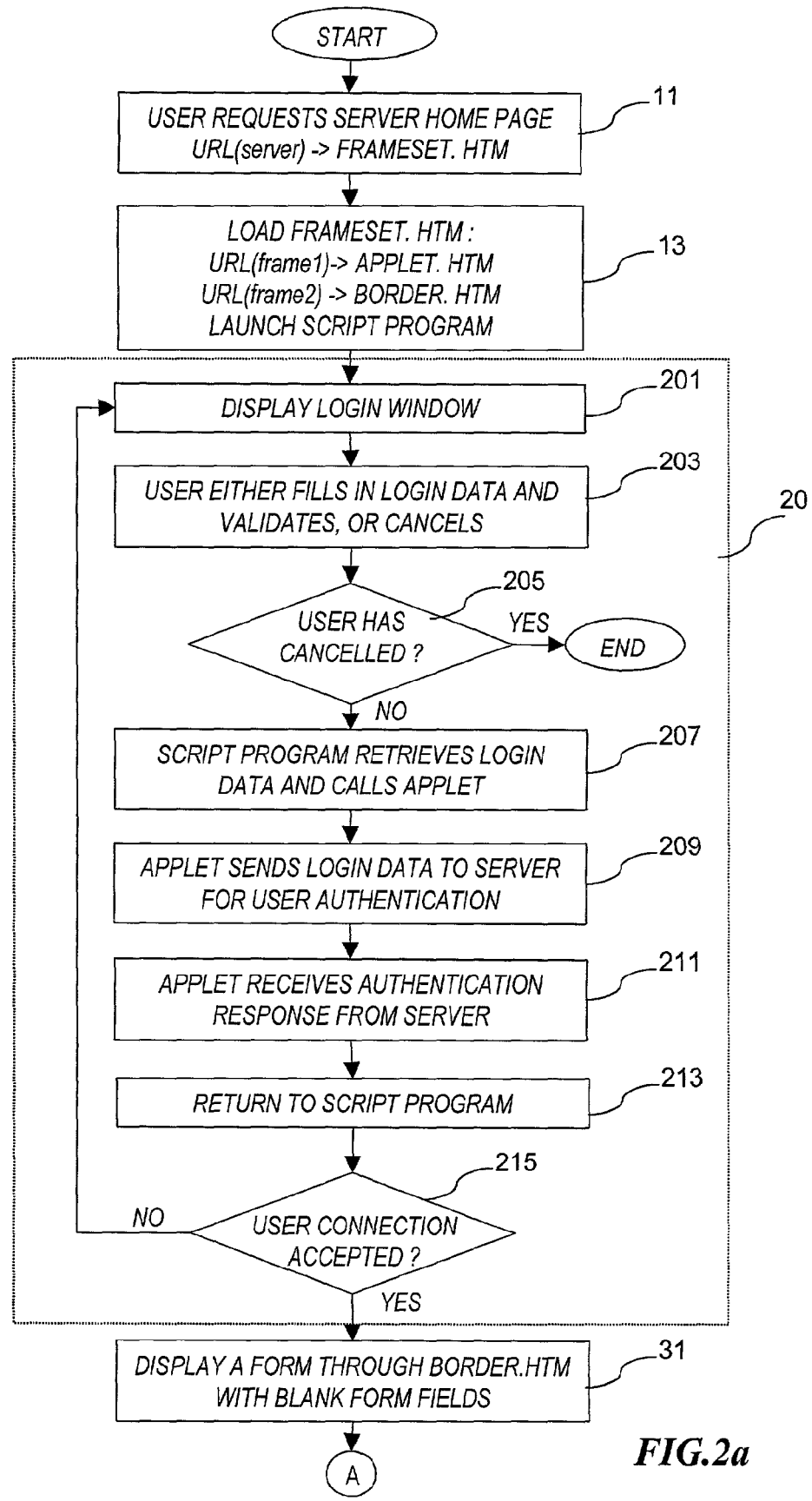
FIGS. 2a-2d, is a flow chart illustrating in more detail a method of fulfilling requests for information data form a network client in accordance with a preferred implementation of the invention.

FIG. 2a details the process of connecting a client browser to the network server (from step 11 to step 31 of FIG. 1), obtaining and displaying a HTML form, in accordance with a preferred implementation of the invention.

Figure 2B:
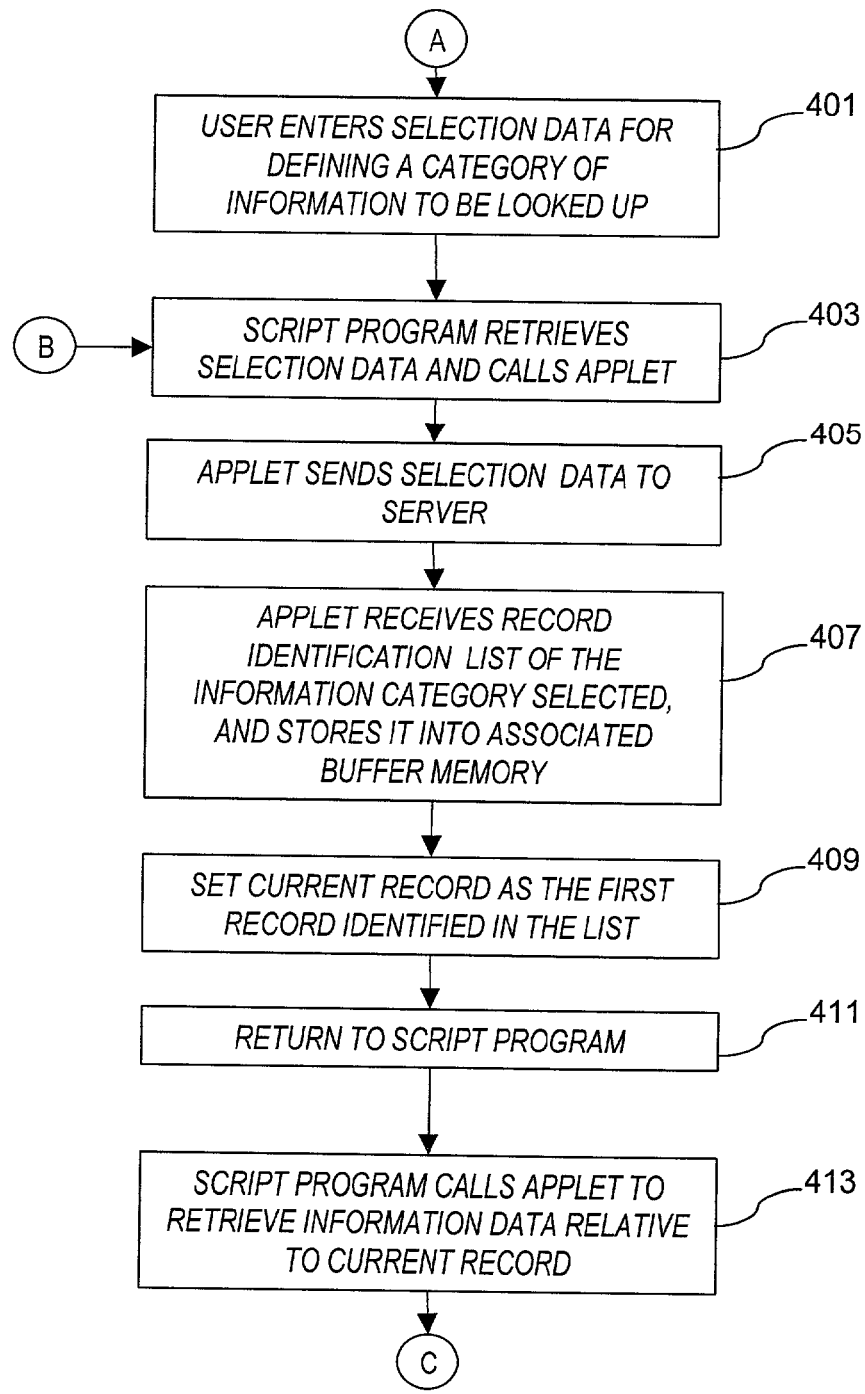
Figure 2C:
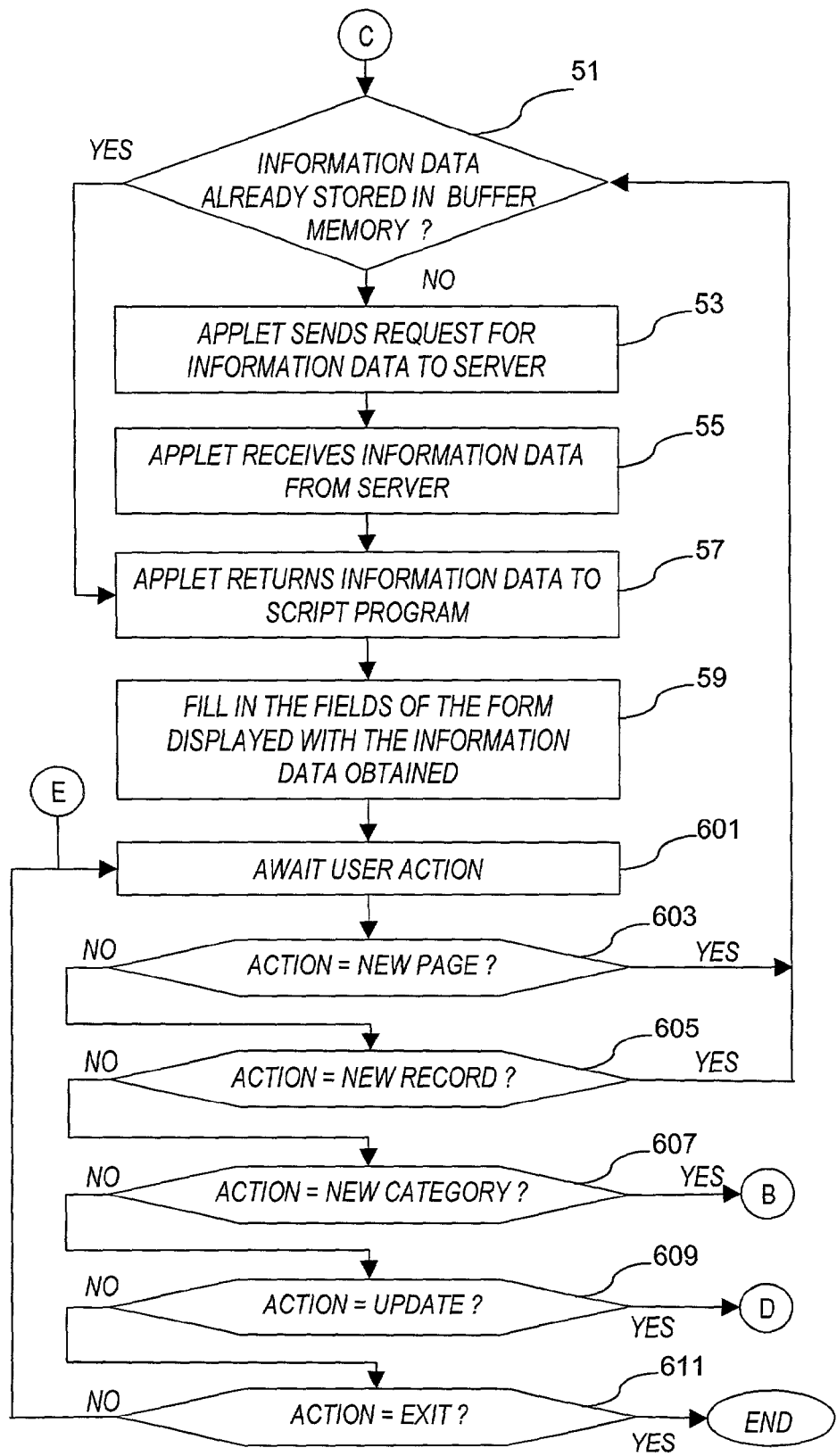

FIGS. 2b-2c detail the process of defining and obtaining from the server information data to look up (from step 41 to step 59 of FIG. 1), in accordance with a preferred implementation of the invention.

Figure 2D:
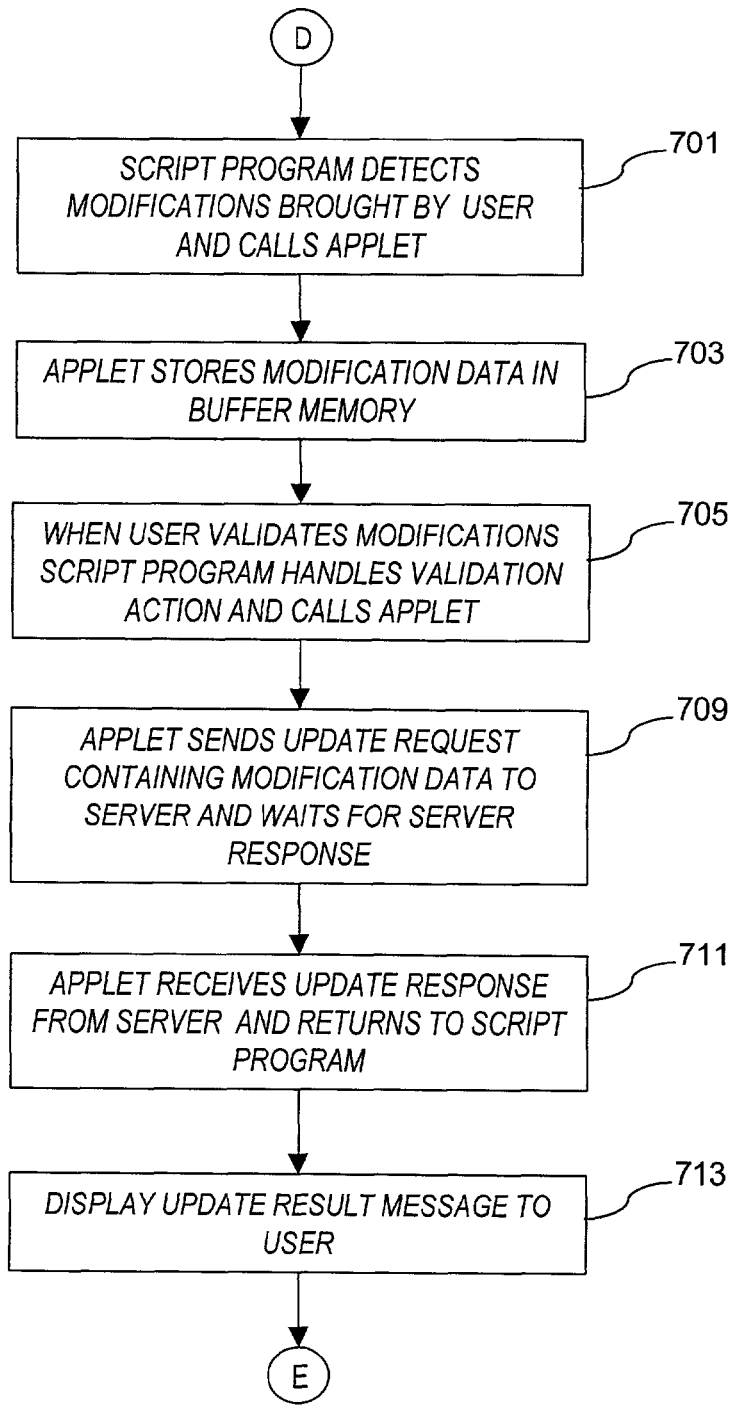

FIG. 2d details the process of updating information data currently displayed to the user.

Referring first to FIG. 2a, first steps 11 and 13 are identical to that of FIG. 1 and therefore will not be described again, as they have been already described supra in connection to FIG. 1.

Next step 20 of FIG. 2a is an authentication step intended for checking the user rights of entering the database serviced by the server. Step 20 includes sub-steps 201 to 215.

After the HTML document (FRAMESET.HTM) has been loaded into the client browser at step 13, the authentication step 20 starts with sub-step 201 in which a login window generated by the (JAVASCRIPT) script program is displayed on the screen to the user.

At following step (203), the user fills in login data such as his user-ID (user identification) and his password, then he validates or cancels, e.g., by clicking on buttons displayed. If the user has cancelled (branch "YES" at determination step 205) the user exits the server home page and the process terminates. On the contrary, if he validates, at next step (207) the script program retrieves the login data entered by the user, and calls a method of the applet component with those login data as input parameters.

At step 209, the applet component sends the login data to the server through a HTTP request (POST request), to enable the server to proceed with the user authentication. At next step 211, the server sends a response to the applet program component, said response (HTTP response) containing the result of the user authentication. Then, the applet component returns the authentication response received to the JAVASCRIPT program (step 213).

At determination step 215, the JAVASCRIPT program evaluates the authentication response. If the user is not identified the login window is again displayed with its fields cleared out and an appropriate message is displayed to the user. Conversely, if the user is well identified, that is, the connection is accepted, then the authentication step (20) is complete and at next step 31 an HTML form, generated from document BORDER.HTM, is displayed with all the information data dedicated fields empty.

The method of fulfilling requests for information according to the invention proceeds with FIG. 2b (through connection point A).

At step 401 of FIG. 2b, the user is prompted to enter a selection data for defining a category of information to be looked up. A category of information is for example, in a human resource database application, a collection of records ("record" is also referred to as "dossier") which concerns a given group of employees in a given company. In that case, one may use the expression "population of dossiers" instead of "category of information".

As such a database is generally hierarchically organized, the user may be provided on the screen with a graphical organizational tree representing the database organization, and he can select the category of information he wants to look up by clicking on a particular branch or leaf of the tree.

In step 403, the JAVASCRIPT program, which controls the graphical user interface, retrieves the selection data entered by the user and calls an applet method (of the applet program component) with those retrieved selection data as input parameters.

At step 405, the applet component sends, through an HTTP request, the selection data to the server. The network server processes the selection data by communicating with the database in a known manner, for example using one or more servlets or CGI modules (refer to above definitions of servlet and CGI modules). In response of the selection data sent by the client, the server generates a record identification list that corresponds to the information category selected. For example in the case mentioned above of a human resource database application, this record identification list can be a list of names alphabetically ordered or a mere list of ordered numbers identifying the corresponding records. Then, the server sends the identification list to the client.

At step 407, in the client browser, the applet component receives the record identification list, and stores it into its associated buffer memory. Then, at step 409, the first record identified in the list is set to be the current record, that is, that record will be the first one to be displayed.

At following step 411, the applet program returns to the JAVASCRIPT program which, in step 413, identifies current record and calls back the applet component to retrieve information data relative to the current record. Then the process continues, through connection point C, at step 51 of FIG. 2c.

In FIG. 2c, steps 51 to 59 are identical to like referenced steps in FIG. 1. Thus, one will refer to the description of these steps made supra in relation to FIG. 1, in order to get more detail.

After step 59 is passed to, in which the fields of the displayed form have been filled with the information data requested by the user, at following step, 601, it is waited for an action, i.e. a command, performed by the user through the user interface displayed. The user actions are detected and processed by the JAVASCRIPT program which controls and manages the graphical user interface.

As shown in the determination steps 603-611, actions performed by the user include:
  requesting a new page (step 603), i.e. more information concerning the information data presently displayed;
  requesting a new record of information (step 605), e.g. information concerning another employee of a same company organizational unit in a case of a human resource database;
  requesting a new category of information (step 607), e.g. information concerning employees of another company organizational unit in a case of a human resource database;
  requesting a modification (update) of certain data of a currently displayed record (step 609), e.g. a dossier concerning a particular employee in a case of a human resource database; and
  requesting the exit from the program application (step 611).

As shown in FIG. 2c, if the action detected is a request for a new page (step 603, YES) then it is determined (step 51) whether the requested page is or not already stored in the buffer memory and the process continues accordingly as previously described (FIG. 1, steps 51-59).

If the detected action is determined to be a request for a new record (step 605, YES) then step 51 is entered again to check whether the requested record is already or not stored in the buffer memory.

If the detected action is a new category request (step 607, YES), then step 403 of FIG. 2b is entered again (through connection point B) to transmit the request to the server via the applet component (steps 403 and seq.) as previously described in connection with FIG. 2b.

If the action is determined to be an update request then step 701 of FIG. 2d is entered through connection point D to proceed with the update process (detailed below).

Finally, if the action detected is an exit action (step 611, YES) then the program terminates, the connection to the database server is over. A new database connection would start again with step 11 of FIG. 2a.

As shown in the implementation example of FIG. 2c, if the action performed by the user corresponds to none of the pre-cited actions (603-611) then step 601 is re-entered to await a new user action, and an appropriate error message is simultaneously displayed on the screen.

Now, in connection with FIG. 2d, there will be detailed the process of updating information data displayed through the fields of the HTML form presented to the user.

The update process starts at step 701 where the script program detects that some of the information data that populate the fields of the HTML form displayed have been modified. As a consequence, the script program retrieves the modified data and calls a method of the applet component with the modified data as input parameters. At following step 703, the applet component (temporarily) stores the modified data in the buffer memory. The user may then look up data from other records within the same category.

At step 705, at a moment chosen by the user before he makes a request for looking up another information category or before he decides to exit the program application, the user can validate the modifications he has previously entered by performing an action through the user interface, e.g., a click on a button dedicated to that update validation function. Responsive to the update validation action (sometimes referred to as "commit" action), the script program handles the validation action and calls a predetermined method of the applet component in order to transmit the update order to the server. The applet component is able to determine what data should be updated in the database and with what value, since it is responsible for temporarily storing the modified data in the buffer memory as previously mentioned (step703).

At following step 709, the applet component sends an update request to the server (HTTP POST request) containing modification data intended to update the corresponding record(s) in the database. Then the applet component waits for the server response.

The server processes the modification of the records to be updated in the database with the modification data received. To this end, the server communicates with the database using one or more application program interfaces such as servlet or CGI programs as already mentioned. Once the "target" records have been updated in the database, the server sends an update response (HTTP response message) to the client computer.

At step 711, in the client computer, the applet component receives the update response and returns the response to the JAVASCRIPT program.

Lastly, at step 713, the JAVASCRIPT program triggers off the displaying of an appropriate message signaling to the user the result of the information data update procedure. Then, the JAVASCRIPT program returns to step 601 of FIG. 2c, through connection point E, in order to await a further user action, and the process continues as previously described.

In brief, according to the invention, a network client user is therefore provided with the capability of modifying at least some of the information data which is presented to him, by changing the content of the corresponding HTML form fields. At first, the modified information contained in the form fields is automatically retrieved (step 701) and the applet component is called in order to store the modified information data in the buffer memory (steps 701, 703). Then in response to an action (validation action) performed by the user (step 705) through the user interface, the program component (applet) is called (step 705) in order to upload to the network server the modified information data (step 709). One advantageous feature is that the user validation action is performed independently of the retrieval of the modified information data. That is, the user may look up other data records and decide to "commit" the modifications applied to one or more records at the end of the database lookup session.

Another important and advantageous feature of the invention is the "coupling" between a script program (JAVASCRIPT program in the preferred implementation) that manages the interaction between the HTML form and a user connected to a network client, and a program component (applet) that controls the interaction between the HTML form presented to the user and the distant server. In particular the program component is provided with a buffer memory allocated to it in the network client, and intended notably for temporarily storing data downloaded to the client or to be uploaded to the server from the client, thus acting as a cache memory.

The method of fulfilling client requests for information data described above makes it possible to save a great deal of network traffic between the client and the server, thanks to a neat separation in the management, between the (HTML) form (i.e. static data or mask data) displayed to the user and the data from the database (i.e. the dynamic data); and thanks to a temporary storing of the dynamic data controlled by the program component in the client machine. Furthermore, the response times in looking up data in the client machine are considerably reduced, due notably to the temporary storage of downloaded data locally in the client machine (in the buffer memory).

Figure 4:
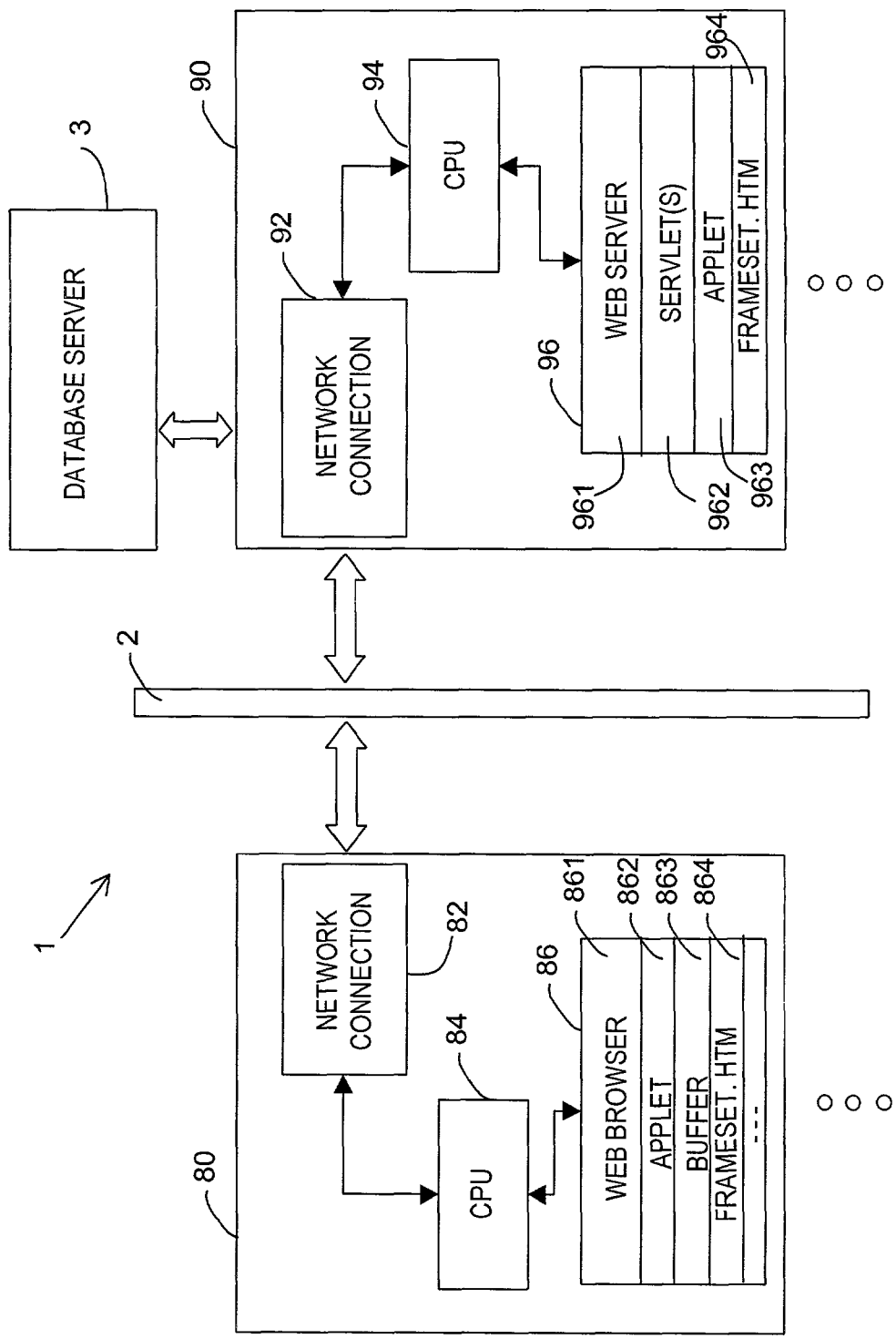
FIG. 4 is a block diagram showing a web client communicating with a web server through a client-server communication network, in accordance with the invention.

Referring now to FIG. 4, there is shown a block diagram showing a web client communicating with a web server through a client-server communication network, in accordance with the invention.

The network 1 includes at least one client computer 80 (herein referred also to as network client or client machine) and at least one server computer 90 (herein referred also to as network server or server machine). The client computer 80 and the server computer 90 are connected by a transmission channel 2, which may be any wire or wireless transmission channel.

The client computer 80 is a standard computer including a Central Processing Unit (CPU) 84, also referred to as a processor, connected to a memory (primary and/or secondary) 86. The memory 86 stores a number of computer programs, including a web browser 861. The web browser 861 may be of the type known in the art. As known in the art, a browser is used to communicate with remote server computers 90 and to visually present the information received from such computers. The client computer 80 establishes network communications through a standard network connection device 82.

Client memory 86 is shown storing an applet program component 862, an HTML document "FRAMSET.HTM" 864 including the documents "APPLET.HTM", and "BORDER.HTM" as described supra in relation to FIG. 3. Memory 86 also includes a memory area 863 serving as a memory buffer used by applet component 862 as described supra. Applet component and "FRAMESET.HTM" document have been downloaded from memory 96 of server computer 90 to client computer 80, after a user has made a request for the web server (961) home page, as previously described in connection with FIG. 1.

The server computer 90 includes standard server computer components, including a network connection device 92, a CPU 94, and a memory (primary and/or secondary) 96. The memory 96 stores a set of computer programs to implement the processing associated with the invention. The memory 96 stores a web server 961. The web server 961 may be of the type known in the art. The memory 96 also stores at least one servlet component 962 intended to serve as an interface between the web server 961 and a database server 3 accessible by server computer 90. The servlet component 962 is designed to implement a method of fulfilling client requests according to the invention. Memory 96 also stores original code 963, 964 of the HTML documents and the applet component. Web server 961 undertakes to send a copy 864 of the HTML documents (FRAMESET.HTM) and an instance 862 of the applet program to the client computer 80, and to process further requests from the client web browser 861.

Database server 3 may be locally attached to or incorporated to server computer 90, or accessible via another network connection, e.g., to a local area network (LAN), through network connection device 92.

Persons skilled in the art will recognize that many variations of the teachings of this invention can be practiced that still fall within the claims of this invention which follow. In particular the present invention is not limited to the Internet and the World Wide Web but also applies to any network using the communication protocols and standards commonly used in the Internet.

What is claimed:

1. A computer program product comprising a non-transitory computer readable medium having computer executable instructions embodied therein, said computer executable instructions when executed by a computer implement a method of fulfilling requests for information data from a network client, said method comprising:

receiving at the network client, sent from the network server, a hypertext document and a program component;

displaying the hypertext document, said hypertext document having initially no information data filling its form fields;

obtaining a request for information from a user of said network client through a user interface presented to the user as a result of the displaying of the hypertext document, and calling the program component for obtaining the requested information data;

upon determination that said requested information data is already stored in a buffer memory allocated to the program component in the network client, obtaining the requested data by retrieving the requested data from the buffer memory and filling the dedicated form fields in the hypertext document with the retrieved information data;

upon determination that said requested information data is not stored in the buffer memory allocated to the program component in the network client, the program component obtaining the requested data by downloading the requested data from the network server and filling the dedicated form fields in the hypertext document with the downloaded information data;

displaying the hypertext document with the requested information data contained therein;

wherein the user is provided with the capability of modifying at least some of the information data which is presented to the user, by changing the content of the corresponding form fields through the user interface;

automatically retrieving the modified information data contained in the form fields and calling the program component in order to store the modified information data in the buffer memory; and in response to an action performed by the user through the user interface, said action being performed independently of the retrieval of modified information data, calling the program component in order to separately upload to the network server the modified information data.

2. The computer program product according to claim 1, wherein displaying the hypertext document, is preceded by a user authentication, upon which, if the user connection to the network server is accepted, said displaying is performed.

3. The computer program product according to claim 1, wherein said hypertext document is a HTML document and wherein the content of the form fields is managed by a script program referenced in said HTML document by appropriate tags, said script program being notably responsible for calling the program component for triggering a download of information data requested by the user, for automatically retrieving from the form fields modified information data and calling the program component for temporarily storing the modified information data in the buffer memory, and for calling the program component for triggering an upload of previously stored modified information data.

4. The computer program product according to claim 3, wherein the obtaining a request for information from a user, includes the following:

using said script program to retrieve selection data entered by the user through said user interface, said selection data defining a category of information to be looked up;

using said program component for sending said selection data to the network server, for receiving in response, from the server, a record identification list corresponding to the information category selected, and storing said identification list into the buffer memory;

using said script program to call the program component in order to retrieve information data relative to a current record identified in said record identification list.

5. The computer program product according to claim 3, wherein said HTML document includes at least two frames and wherein said script program and said program component are referenced in the HTML document within two different frames.

6. The computer program product according to claim 3, wherein said script program is an ECMAScript program.

7. The computer program product according to claim 3, wherein said program component is an applet referenced in said HTML document by appropriate tags.

8. The computer program product according to claim 1, wherein said hypertext document and/or said information data is downloaded or uploaded from or to the network server by using the HTTP protocol.

9. A system for fulfilling requests for information data from a network client, comprising a processor and a memory wherein the memory stores a program having instructions for:

receiving at the network client, sent from the network server, a hypertext document and a program component;

displaying the hypertext document, said hypertext document having initially no information data filling its form fields;

obtaining a request for information from a user of said network client through a user interface presented to the user as a result of the displaying of the hypertext document, and calling the program component for obtaining the requested information data;

upon determination that said requested information data is already stored in a buffer memory allocated to the program component in the network client, obtaining the requested data by retrieving the requested data from the buffer memory and filling the dedicated form fields in the hypertext document with the retrieved information data;

upon determination that said requested information data is not stored in the buffer memory allocated to the program component in the network client, the program component obtaining the requested data by downloading the requested data from the network server and filling the dedicated form fields in the hypertext document with the downloaded information data;

displaying the hypertext document with the requested information data contained therein;

wherein the user is provided with the capability of modifying at least some of the information data which is presented to the user, by changing the content of the corresponding form fields through the user interface;

automatically retrieving the modified information data contained in the form fields and calling the program component in order to store the modified information data in the buffer memory; and in response to an action performed by the user through the user interface, said action being performed independently of the retrieval of modified information data, calling the program component in order to separately upload to the network server the modified information data.

10. The system according to claim 9, wherein displaying the hypertext document, is preceded by a user authentication, upon which, if the user connection to the network server is accepted, said displaying is performed.

11. The system according to claim 9, wherein said hypertext document is a HTML document and wherein the content of the form fields is managed by a script program referenced in said HTML document by appropriate tags, said script program being notably responsible for calling the program component for triggering a download of information data requested by the user, for automatically retrieving from the form fields modified information data and calling the program component for temporarily storing the modified information data in the buffer memory, and for calling the program component for triggering an upload of previously stored modified information data.

12. The system according to claim 11, wherein the obtaining a request for information from a user, includes the following:
- using said script program to retrieve selection data entered by the user through said user interface, said selection data defining a category of information to be looked up;
    - using said program component for sending said selection data to the network server, for receiving in response, from the server, a record identification list corresponding to the information category selected, and storing said identification list into the buffer memory;
- using said script program to call the program component in order to retrieve information data relative to a current record identified in said record identification list.

13. The system according to claim 11, wherein said HTML document includes at least two frames and wherein said script program and said program component are referenced in the HTML document within two different frames.

14. The system according to claim 11, wherein said script program is an ECMAScript program.

15. The system according to claim 11, wherein said program component is an applet referenced in said HTML document by appropriate tags.

16. The system according to claim 9, wherein said hypertext document and/or said information data is downloaded or uploaded from or to the network server by using the HTTP protocol.

* * * * *